United States Patent [19]
Home

[11] Patent Number: 5,553,638
[45] Date of Patent: Sep. 10, 1996

[54] PRESSURE-LOADED CYLINDER VALVE INSERT

[76] Inventor: William Home, 9Fl.-3, No. 374, Sec. 2, Pa Teh Rd., Taipei, Taiwan

[21] Appl. No.: 427,604

[22] Filed: Apr. 24, 1995

[51] Int. Cl.[6] ................................................ F16L 37/28
[52] U.S. Cl. ........................ 137/327; 137/613; 251/149.6
[58] Field of Search .......................... 251/149.1, 149.6, 251/368; 137/613, 315, 327, 328; 289/39

[56] References Cited

U.S. PATENT DOCUMENTS

| | | | |
|---|---|---|---|
| 3,532,101 | 10/1970 | Snyder, Jr. | 251/149.7 X |
| 3,583,667 | 7/1969 | Amneus, Jr. | 251/149.6 X |
| 5,330,155 | 7/1994 | Lechner | 251/149.6 |

*Primary Examiner*—Kevin Lee
*Attorney, Agent, or Firm*—Coudert Brothers

[57] ABSTRACT

A cylinder valve insert is used to be mounted within the outlet of a cylinder valve of a cylinder to allow a fluid to pass through the valve when a male fitting is sufficiently engaged with the outlet, and to prevent such fluid flow when the male fitting is separated therefrom. The valve insert includes a body member adapted to be mounted in the outlet; a docking member which is mounted in the body member, has a tapered portion facing away from the normal flow direction of the fluid; a valve member which has a part mounted in the body member and the docking member and movable relative thereto, defines a fluid passage communicating with an open end of the outlet; a sealing member which is mounted surrounding the valve member, is adapted to control such fluid flow from the cylinder to enter into the fluid passage; and a spring which is located between an inner end face of the outlet and the valve member, is adapted to exert a pushing force to push the valve member toward the body member.

12 Claims, 5 Drawing Sheets

5,553,638

PRESSURE-LOADED CYLINDER VALVE INSERT

FIELD OF THE INVENTION

The present invention is related to the field of LPG cylinder valves and pressure regulators for household and recreational vehicle use, and, more particularly, to an improved insert which is adapted to be mounted to the outlet end of a cylinder valve to improve sealing with a separable male fitting. Also, the present invention is related to an insert assembly and an improved nipple for the male fitting.

BACKGROUND OF THE INVENTION

Conventionally, gaseous fuels in a pressure vessel, commonly known as a "cylinder", is supplied to a household heating device or recreational vehicle merely through a cylinder valve connecting a male fitting. This prior art has many disadvantages. Thus, an improved cylinder valve insert has been developed. The most market successful cylinder valve insert is disclosed in U.S. Pat. No. 5,330,155 to Lechner, issued on Jul. 19, 1994, which is incorporated herein as a reference. Although this prior valve insert can effectively achieve its intended functions, it still has some disadvantages. Among these disadvantages is that (please refer to FIGS. 3 and 4 of the '155 patent) due to the arrangement of the prior insert 40, when the male fitting 54 is screwed onto the cylinder valve 41, the nipple 52 firstly pushes the docking member 59; then, via the docking member 59, the nipple 52 pushes the valve member 58 in a leftward direction to overcome the biasing force produced by the spring 97 to release the sealing achieved between the seal 80 and the seat 72. In this arrangement, after repeated connection and disconnection of the cylinder valve 41 and the male fitting 54, the strength of the spring 97 may be weakened with a result that before the nipple 52 can hermetically engage with the docking member 59, the nipple 52 may have already pushed the valve member 58 in a leftward direction to release the sealing achieved between the seal 80 and the seat 72. In this situation, a leakage of gas may occur between the nipple 52 and the docking member 59. Furthermore, due to the nipple 52 needing to axially push the docking member 59 to move in a leftward direction, the front end face of the nipple 52 will exert a concentrated force on the docking member 59, which causes the docking member 59 to be locally subjected to a large stress, as a result the resilience of the docking member 59 will locally degrade quickly. Therefore, a frequent replacement of the docking member 59 is required.

In view of the above said disadvantages of the '155 patent, the present invention is disclosed to have a cylinder valve insert wherein the hermetic engagement between the docking member and the nipple will not be affected due to the decreasing of strength of the spring. In addition, the nipple of the present invention does not push the valve member via the docking member. Furthermore, the nipple will not exert an axially concentrated force on the docking member. Moreover, the present invention also discloses an embodiment which constructs the valve insert as a separated unit from the cylinder valve and can be easily and firmly mounted onto the latter.

SUMMARY OF THE INVENTION

With parenthetical reference numbers to the parts, portions or surfaces of the disclosed embodiment, they are used for purpose of illustration, but not by way of limitation.

The present invention provides a valve insert (10) adapted to be removably mounted in one fluid conduit (for example, a cylinder valve outlet (82)) to selectively enable a flow of fluid (e.g., either a liquid or a gas and typically propane) flowing therethrough when another fluid conduit (for example a male fitting (90)) is sufficiently connected thereto, and blocking such fluid flow when the conduits are separated from each other.

The present cylinder valve insert (10) includes: a body member (40) which has an outer threaded portion for threadedly and hermetically engaging with an inner threaded portion of the cylinder valve outlet (82) and defines a base portion (42) having a seat (422) and a hole extending therethrough, and a recess (44) with an inner diameter larger than that of the hole, a docking member (70) mounted within the mouth (44) and defining a hole and a tapered hole (72) flaring from the hole, wherein the hole is concentric with and has a size substantially the same as that of the hole of the body member (40), a valve member (30) partly mounted within the body member (40) and the docking member (70) and movable relative thereto, defining substantially a first portion which is protruded from the body member (40) and has a groove (36) defined on its outer periphery and a stub with an enlarged head (34), a second portion and a third portion substantially located within the body member (40) and the docking member (70), respectively, wherein the second portion has holes (31) formed on its outer periphery and extending radially toward its center, and the third portion has an axially extending stepped blind hole (32) communicating the radially extended holes (31) to an open end (81) of the outlet (82) and an abutment face (38) formed within the blind hole (32), a spring (60) having one end fixedly attached to the enlarged head (34) of the stub of the first portion of the valve member (30) and another end seated on an inner end face (83) of the outlet (82), and a O-ring (50) located in the groove (36) formed on the outer periphery of the first portion of the valve member (30). When a male fitting (90) is not sufficiently engaged with the outlet (82), the spring (60) will exert a force to push the O-ring (50) hermetically seated on an edge of the seat (422) so that a fluid flow from the cylinder is prevented from flowing out of the cylinder valve (80). Alternatively, when a male fitting (90) is engaged with the outlet (82), the tapered portion of the docking member (70) will firstly form a hermetical seal with an arcuate side face (94) of a nipple (92) of the male fitting (90), and, then, the valve member (30) will be pushed toward the cylinder valve (80) by a pushing force of an end face (96) of the nipple (92) acting on the abutment face (38), whereby the seal between the O-ring (50) and the seat (422) is released so that the fluid in the cylinder (not shown) can flow from the passages (88 and 84) through the radially extending holes (31) and the blind hole (32) of the valve member (30) to a conduit (98) within the male fitting (90) and finally to an end user device.

In another embodiment, the body member (40), the valve member (30), the docking member (70) and the spring (6) are integrally mounted within a housing member (100) as a single unit, wherein the housing member (100) has an outer threaded portion (102) adapted to be screwed onto the outlet (82). A specially designed wrench (120) is disclosed to engage with mating notches (107) formed on an outer periphery of the housing member (100) to facilitate a more firm screwed-in of the housing member (100) onto the cylinder valve outlet (82) thereby to prevent a child from rotating the housing member (100), and, thus, the insert (10) out of the cylinder valve (80).

It is an objective of the present invention to provide a cylinder valve insert which can guarantee a more hermetical engagement between the insert and the nipple of the male fitting when the male fitting is connected to the cylinder valve.

A further objective of the present invention is to provide a cylinder valve insert which has a docking member with a longer use-life.

It is a further objective of the present invention to provide an insert as a single unit which is separable from the cylinder valve and can be easily and firmly mounted onto the outlet of the cylinder valve.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
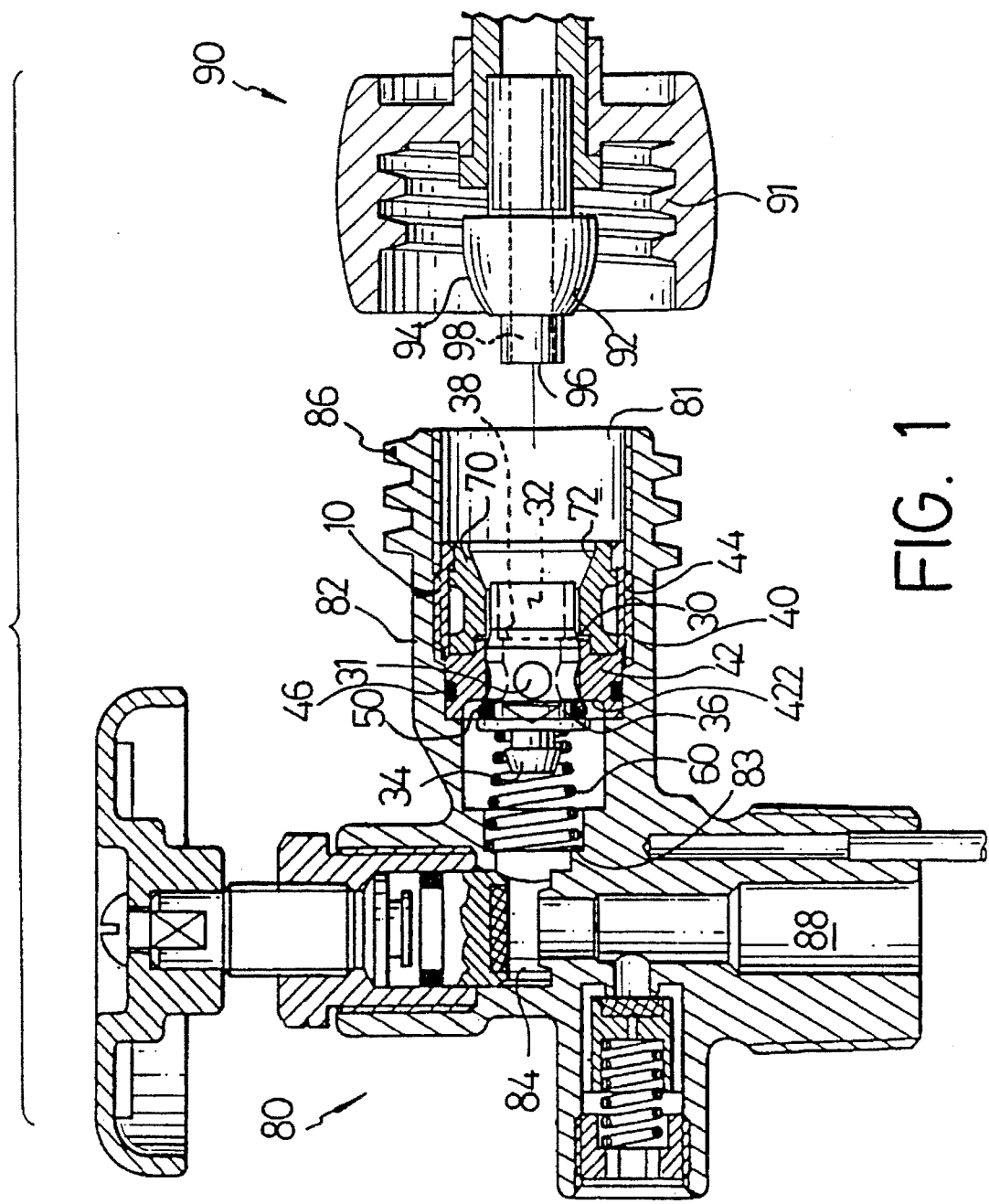
FIG. 1 is an elevational, cross-sectional view showing a cylinder valve insert and a male fitting in accordance with the present invention, wherein the cylinder valve insert is mounted into a cylinder valve outlet and the male fitting is not connected to the cylinder valve.

Please refer to FIG. 1 which shows that a present pressure-loaded cylinder valve insert 10 is mounted within a cylinder valve outlet 82 of a cylinder valve 80 which has passages 88 and 84 communicated with a cylinder (not shown) for gaseous fuels, for example, propane. The cylinder valve outlet 82 has an outer threaded portion 86 surrounding an open end 81 thereof. The threaded portion 86 is used to matingly engage with an inner threaded portion 91 of a male fitting 90 which includes a nipple 92 defining an arcuate side face 94, a front end face 96 and a conduit 98. The present cylinder valve insert 10 includes a body member 40 which has an outer threaded portion for threadedly and hermetically engaging with an inner threaded portion of the cylinder valve outlet 82. An O-ring 46 is provided to surround an outer periphery of the body member 40 to enhance the hermetical engagement between the cylinder valve outlet 82 and the body member 40. The body member 40 generally defines a base portion 42 and a recess 44. The base portion 42 defines a seat 422 against which an O-ring 50 can be hermetically seated and further defines a hole through which a valve member 30 can slide in relation thereto. Furthermore, the recess 44 of the body member 40 has an inner diameter larger than that of the hole of the body member 40 and is used for receiving a docking member 70. The docking member 70 is constructed to have an axially extending hole and a tapered portion 72 flaring from the hole and facing toward the open end 81. The tapered portion 72 is used to hermetically engage with the arcuate side face 94 of the nipple 92 of the male fitting 90, which will be discussed in more detail below. A valve member 30 is generally mounted within and slideable relative to the body member 40 and the docking member 70. The valve member 30 generally can be divided into three portions. The first portion is protruded from the body member 40. The first portion includes a stub with an enlarged head 34 which is used to fixedly engage with an end of a spring 60 which has another end seated on an inner end face 83 of the outlet 82, and a groove 36 which is used to receive the O-ring 50. The second portion is substantially located within the hole of the body member 30. On an outer periphery of the second portion, the valve member 30 is provided with holes 31 extending radially toward a center thereof. The third portion is substantially located within the axially extending hole of the docking member 70. The valve member 30 has an axially extending stepped blind hole 32 generally extending from the second portion to the third portion and communicating the radially extending holes 31 of the second portion to the open end 81 of the outlet 82. The stepped blind hole 32 further defines an abutment face 38 for engaging with the end face 96 of the nipple 92 of the male fitting 90, which will be discussed in more detail below.

When the male fitting 90 is not screwed onto the cylinder valve outlet 82, the spring 60 will exert a pushing force to the valve member 30 to cause the O-ring 50 which is mounted surrounding the first portion of the valve member 30 to be hermetically seated against an edge of the seat 422 of the base portion 42 of the body member 40. In that situation, the seat 422, the O-ring 50 and the first portion of the valve member 30 are cooperated to close the hole of the base portion 42 of the body member 40 from the gas passages 88 and 84. Thus, gas is prevented from flowing from the cylinder into the hole of base portion 42 of the body member 40, and, then through the radially extending holes 31 of the valve member 30.

Figure 2:
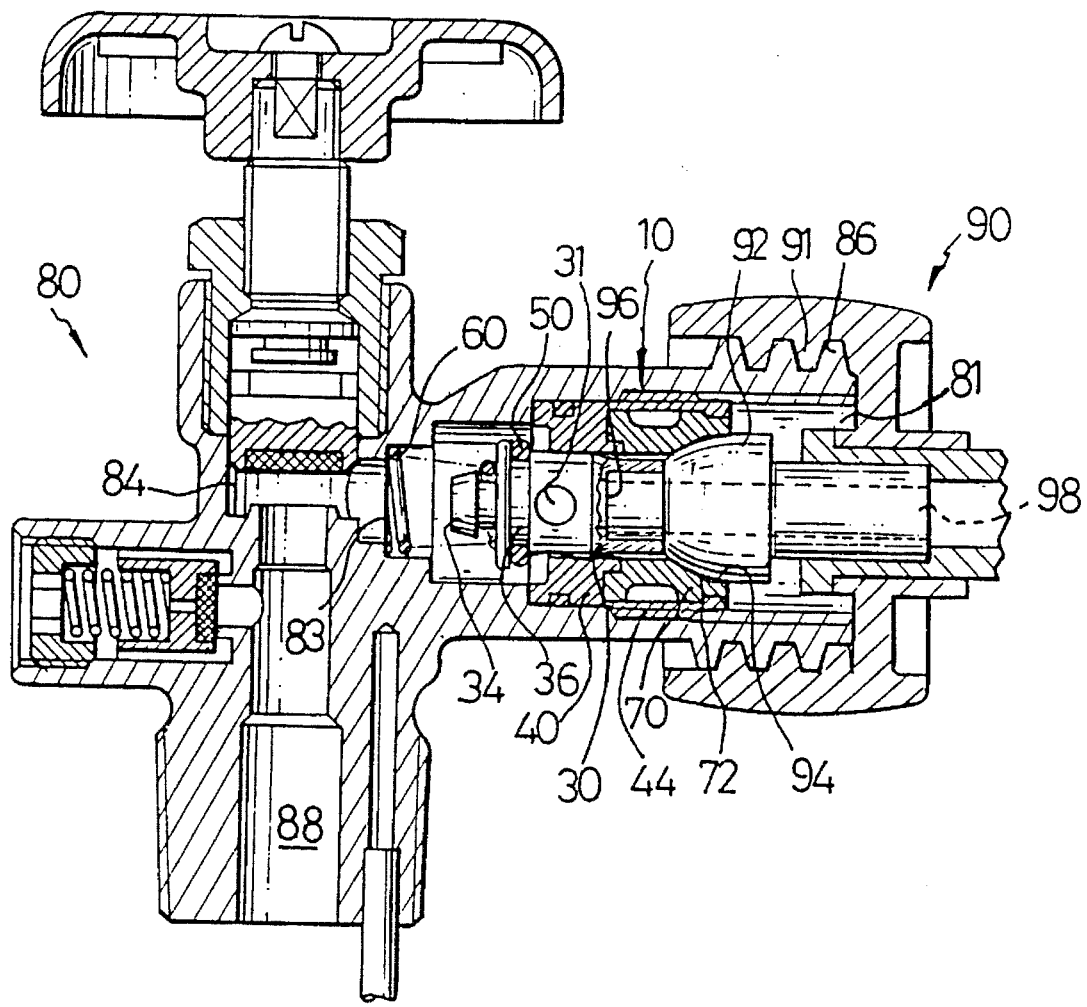
FIG. 2 is a view similar to FIG. 1, but with the male fitting being connected to the cylinder valve.

FIG. 2 shows that the inner threaded portion 91 of the male fitting 90 is screwed onto the outer threaded portion 86 of the cylinder valve outlet 82, wherein the hermetically sealing achieved by the seat 422, the O-ring 50 and the first portion of the valve member 30 is released. When the male fitting 90 is screwed onto the cylinder valve outlet 82, firstly, the arcuate side face 94 of the nipple 92 is hermetically engaged with the tapered portion 72 of the docking member 70 and the front end face 96 of the nipple 92 contacts with the abutment face 38 within the blind stepped hole 32 and the conduit 98 is aligned with a left side portion of the blind stepped hole 38, wherein the left side portion has an inner diameter smaller than that of a right side portion defining the abutment face 38.

Then, as the screwing-in of the male fitting 90 continues, due to the docking member 30 being made of resilient material, the nipple 92 can further move to push the valve member 30 in a leftward direction to compress the spring 60 to release the hermetical sealing achieved by the seat 422, the O-ring 50 and the first portion of the valve member 30. In this situation, the gases from the cylinder can flow through the passages 88 and 84 and a gap defined between the O-ring 50 and an inner wall of the outlet 82 to enter into the radially extending holes 31 of the valve member 30, and, thereafter, the blind hole 32 and the conduit 98 of the male fitting 98 and a hose (not shown) to reach an end user device (not shown).

Finally, when the male fitting 90 is fully screwed onto the cylinder valve outlet 82 to reach its end position as shown in FIG. 2, the valve member 30 is pushed in a leftward direction a maximum distance from its original position as shown in FIG. 1. In this situation, the amount of gaseous fuel flowing from the cylinder to the end user device (not shown) is maximum.

Figure 3:
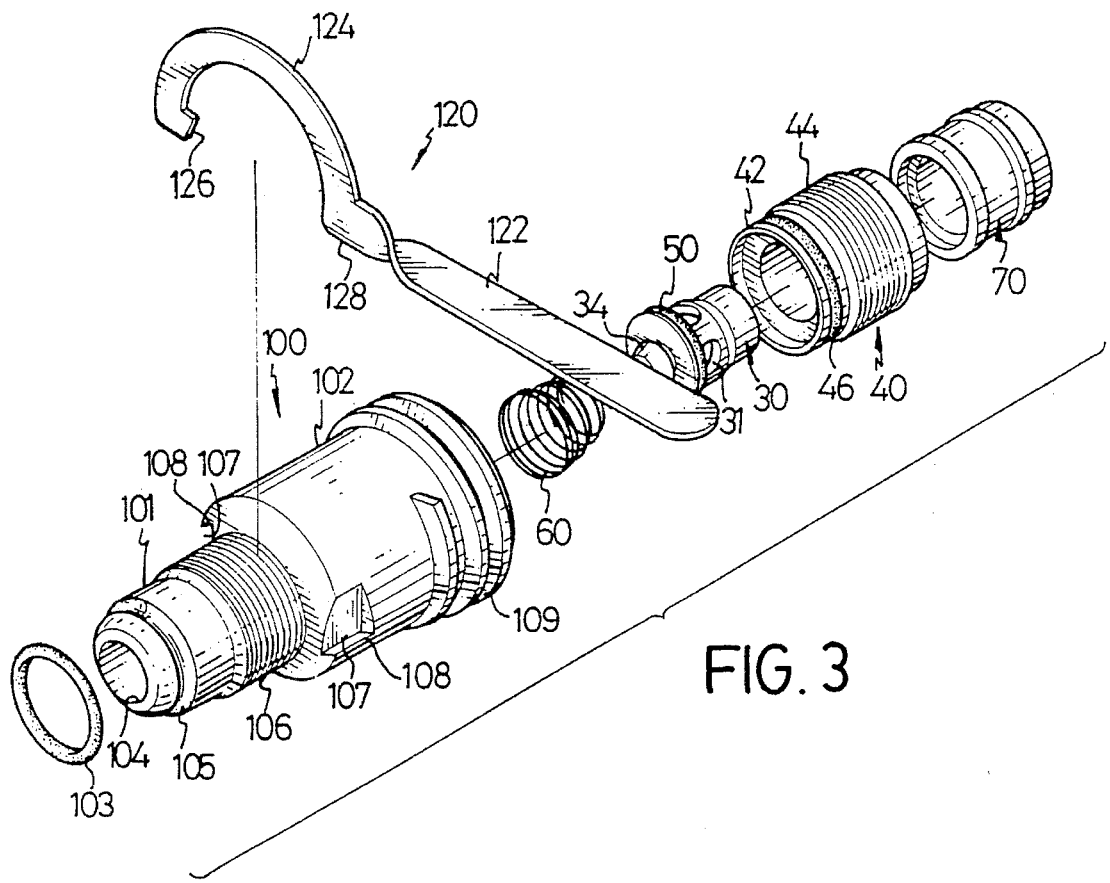
FIG. 3 is a perspective, exploded view showing an another embodiment of the valve insert in accordance with the present invention, wherein the valve insert is assembled into a single unit adapted to be easily screwed onto a cylinder valve; in addition, FIG. 3 also shows a wrench specially designed for firmly rotating the insert assembly onto the outlet of a cylinder valve.
Figure 4:
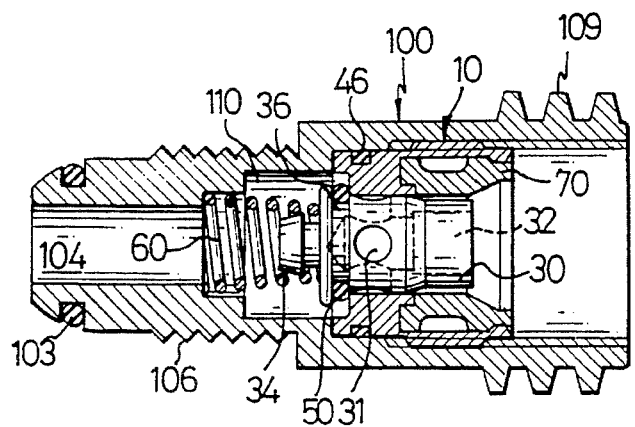
FIG. 4 is an elevational, cross-sectional view showing the insert assembly of FIG. 3.

FIGS. 3 and 4 respectively show an alternative embodiment of the present invention wherein the spring 60, the valve member 30, the O-rings 46 and 50, the body member 40 and the docking member 70 shown in FIGS. 1 and 2 are similar to those as shown herein. These similar parts bear the same reference numbers, and do not have further disclosures. In this alternative embodiment, the present invention proposes a housing member 100 to receive the spring 60, the valve member 30, the O-rings 46 and 50, the body member 40 and the docking member 70 to be as a single unit so that the present cylinder valve insert 10 can be easily mounted onto the cylinder valve outlet 82.

The housing member 100 is constructed to have a generally tubular configuration which has a front portion 101 with a small outer diameter and a rear portion 102 with a large outer diameter. On a front end of the front portion 101, the housing member 100 is formed with a groove 105 for receiving an O-ring 103. Within the front end, the housing member 100 is formed with a conduit 104. The O-ring 103 enhances the hermetical sealing between the housing member 100 and the cylinder valve outlet 82, and the conduit 104 communicates with the passages 84 and 88 of the cylinder valve 80, when the housing member 100 is screwed onto the cylinder valve outlet 82 (see FIGS. 5 and 6). An inner space 110 is formed within the housing member 100 and in communication with and adjacent to the conduit 104. The space 110 is used to receive the spring 60, the O-ring 50 and the first portion of the valve member 30. On a rear end of the front portion 101, the housing member 100 is formed with an outer threaded portion 106 for being screwed into the cylinder valve outlet 82.

Additionally, as shown in FIG. 3, on a front end of the rear portion 102, the housing member 100 is provided with two diametrically opposite L-shaped notches 107 respectively defining a generally horizontally extending face 108 and 108' for incorporating with a hooked portion 126 and a flat portion 128 of a specially designed wrench 120 to rotate the housing member 100 clockwise (seen from the front end of the housing member 100) to screw it onto the cylinder valve outlet 82. The wrench 120 has a handle 122 and a C-shaped head 124 in which the hooked portion 126 and the flat portion 128 is formed. On a rear end of the rear portion 102, the housing member 100 is equipped with a threaded portion 109 for receiving the male fitting 90. The threaded portion 109 is coarser than that of the threaded portion 106.

Figure 5:
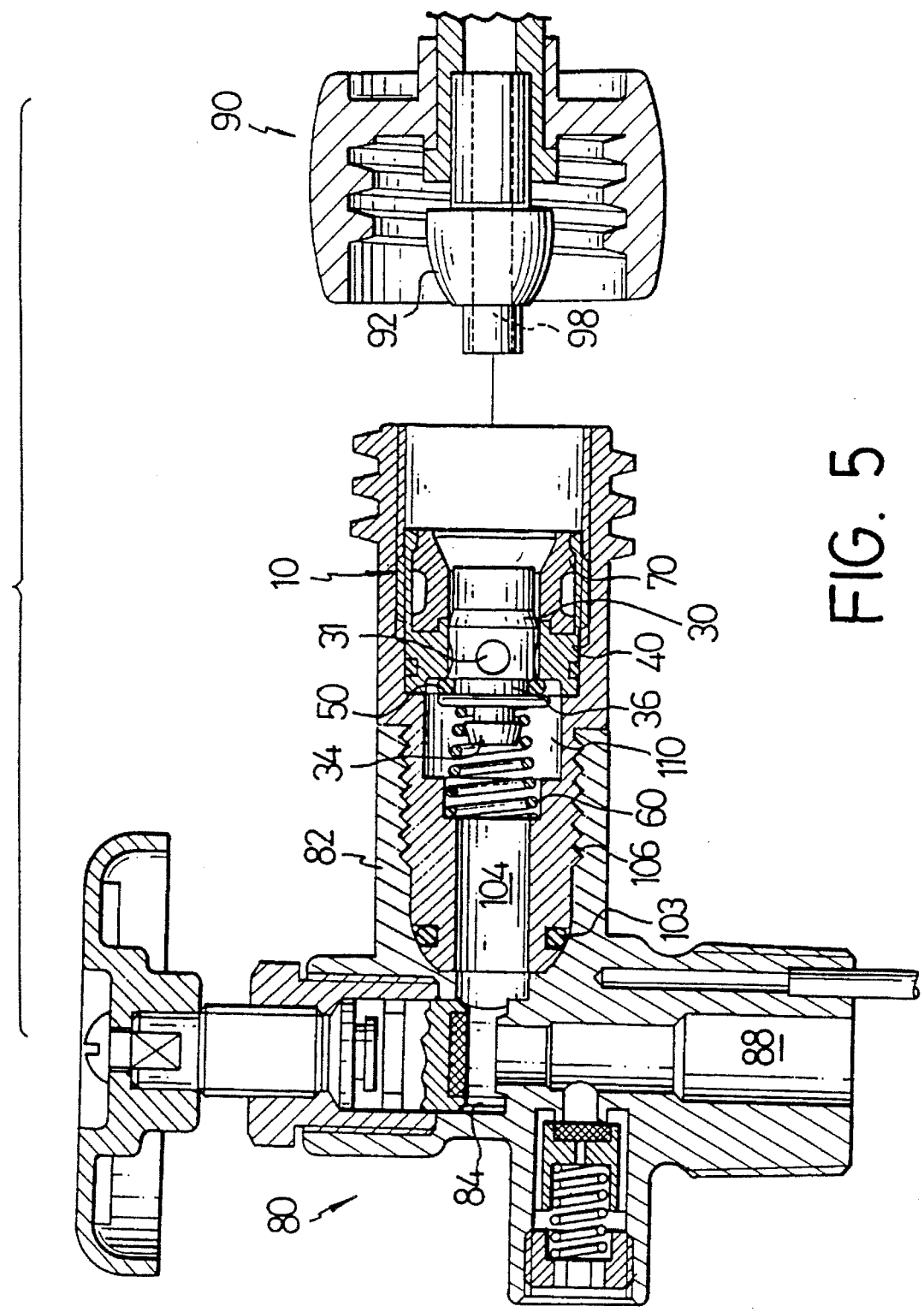
FIG. 5 is an elevational, cross-sectional view showing the insert assembly of FIG. 3 being screwed onto a cylinder valve and a male fitting being not connected to the cylinder valve.
Figure 6:
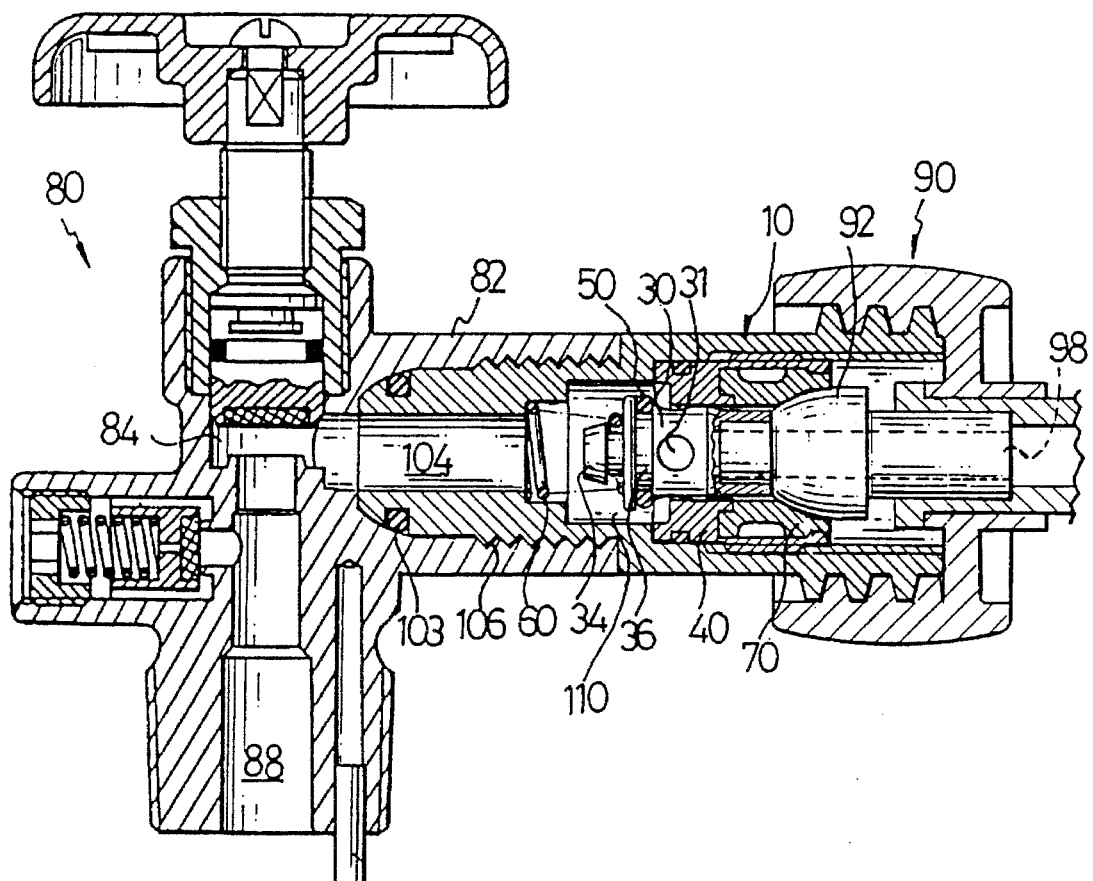
FIG. 6 is an view similar to FIG. 5, but with the male fitting being connected to the cylinder valve.

FIGS. 5 and 6 respectively show that the cylinder valve insert 10, which has been assembled into the housing member 100, is mounted onto the cylinder valve outlet 82. FIG. 5 shows that the male fitting 90 is not engaged with the cylinder valve insert 10 so that the spring 60 exerts a force to the O-ring 50 to block the communication between the radially extending holes 31 of the valve member 30 and the space 110. FIG. 6 shows that the male fitting 90 is sufficiently engaged with the cylinder valve outlet 82 to push the valve member 30 in a leftward direction to release the blockage achieved by the seat 422, the O-ring 50 and the first portion of the valve member 30, so that gaseous fuel can flow from the cylinder (not shown) through the passages 88 and 84, the conduit 104, the space 110, the valve 30, the conduit 98 and a hose (not shown) and finally to an end user device (not shown).

Although the invention has been explained in relation to its preferred embodiment, it is to be understood that many other possible modifications and variations can be made without departing from the spirit and scope of the invention as hereinafter claimed.

I claim:

1. A valve insert adapted to be mounted in a first fluid conduit to enable a flow of fluid therethrough when a second fluid conduit is sufficiently engaged therewith and to prevent such fluid flow when the two fluid conduits are separated from each other, comprising:

a tubular housing member having two generally L-shaped notches formed on an outer periphery thereof, said notches being adapted to matingly receive a wrench with a hooked end and a flat end to rotate said housing member when the valve insert is positioned within the first conduit;

a body member hermetically mounted within said tubular housing member, defining a base portion with a seat facing toward the normal direction of fluid flow, a hole, and a recess with an inner diameter larger than that of said hole, said hole and said recess passing through said body member, and said recess positioned on a downstream site of the normal direction of fluid flow;

a sleeve-like docking member fixedly mounted in said recess, defining a tapered portion flaring from a center of said docking member and facing away from the normal direction of fluid flow;

a valve member movable relative to said body member and said docking member, comprising a first portion having a biasing member mounting means and a sealing member mounting means, and further comprising a second portion located in said body member for defining a fluid passage communicating with the first fluid conduit, said second portion having an abutment face facing away from the normal direction of fluid flow;

a biasing member within said tubular housing connected to said biasing member mounting means for exerting a force to push said valve member toward said body member;

a sealing member within said tubular housing mounted on said sealing member mounting means; and coupling means for selectively holding the first and second fluid conduits together when the second fluid conduit is engaged with the valve insert;

whereby when the first and second fluid conduits are separated from each other, said biasing member will act on said valve member to urge said sealing member hermetically seated on an edge of said seat of said body member to form a blockage to prevent fluid from flowing from said first portion to said fluid passage of said second portion of said valve member, and when the first and second fluid conduits are connected together, the second fluid conduit will firstly form a hermetical engagement with said tapered portion of said docking member and then push said valve member by engaging with said abutment face and communicating with said fluid passage to release said blockage achieved by said sealing member and said seat so that fluid is permitted to flow from said first portion to said fluid passage of said second portion of said valve member to enter into the second fluid conduit.

2. A valve insert according to claim 1, wherein said first fluid conduit is the outlet of a cylinder valve.

3. A valve insert according to claim 2, wherein said cylinder valve outlet comprises an inner threaded portion, wherein said tubular housing member comprises an outer threaded portion adapted to matingly engage said inner threaded portion when said valve insert is mounted within said outlet.

4. A valve insert according to claim 2, where said second fluid conduit is a nipple adapted to be inserted into said outlet.

5. A valve insert according to claim 4, wherein said nipple defines an arcuate side face and an end face, and wherein when said nipple engages with said insert, said arcuate side face will firstly engage with said tapered portion of said docking member, and, then, said end face urges said valve member via said abutment face, when said nipple further engages with said insert.

6. A valve insert according to claim 1, where said fluid passage comprises holes extending radially from an outer periphery of said second portion of said valve member toward a center thereof and a blind hole axially extending in said second portion of said valve member and communicating said radially extending holes with said first fluid conduit.

7. A valve insert according to claim 6, wherein said abutment face is located within said blind hole.

8. A valve insert according to claim 1, wherein said biasing member mounting means is a stub with an enlarged head for fixedly engaging with said biasing member.

9. A valve insert according to claim 1, wherein said sealing member mounting means is a groove defined in an outer periphery of said first portion of said valve member.

10. A valve insert according to claim 1, wherein said biasing member is a spring located between said valve member and an inner end face of said first fluid conduit.

11. A valve insert according to claim 1, wherein said docking member is formed of a resilient material.

12. A valve insert adapted to be mounted in an outlet of a cylinder valve having an inner threaded portion to enable a flow of fluid therethrough when a fluid conduit is sufficiently engaged therewith and to prevent such fluid flow when the fluid conduit is separated from the cylinder valve, comprising:

- a tubular housing member having an outer threaded portion adapted to matingly engage the inner threaded portion of the outlet, and further having two generally L-shaped notches formed on an outer periphery thereof, said notches being adapted to matingly receive a wrench with a hooked end and a flat end to rotate said housing member within the outlet;
- a body member hermetically mounted within said tubular housing member, defining a base portion with a seat facing toward the normal direction of fluid flow, a hole, and a recess with an inner diameter larger than that of said hole, said hole and said recess passing through said body member, and said recess positioned on a downstream site of the normal direction of fluid flow;
- a sleeve-like docking member fixedly mounted in said recess, defining a tapered portion flaring from a center of said docking member and facing away from the normal direction of fluid flow;
- a valve member movable relative to said body member and said docking member, comprising a first portion having a biasing member mounting means and a sealing member mounting means, and further comprising a second portion located in said body member for defining a fluid passage communicating with the cylinder valve, said second portion having an abutment face facing away from the normal direction of fluid flow;
- a biasing member within said tubular housing connected to said biasing member mounting means for exerting a force to push said valve member toward said body member;
- a sealing member within said tubular housing mounted on said sealing member mounting means;
- coupling means for selectively holding the cylinder valve with the fluid conduit when the fluid conduit is engaged with the valve insert;
- whereby when the fluid conduit is separated from the cylinder valve, said biasing member will act on said valve member to urge said sealing member hermetically seated on an edge of said seat of said body member to form a blockage to prevent fluid from flowing from said first portion to said fluid passage of said second portion of said valve member, and when the fluid conduit is engaged with the cylinder valve, the fluid conduit will firstly form a hermetical engagement with said tapered portion of said docking member and then push said valve member by engaging with said abutment face and communicating with said fluid passage to release said blockage achieved by said sealing member and said seat so that fluid is permitted to flow from said first portion to said fluid passage of said second portion of said valve member to enter into the fluid conduit.

* * * * *